United States Patent
Stanciu et al.

(10) Patent No.: US 10,911,214 B2
(45) Date of Patent: Feb. 2, 2021

(54) PREAMBLE DETECTION IN WIRELESS SYSTEMS WITH INTERMITTENT RECEPTION

(71) Applicant: NXP USA, Inc., Austin, TX (US)

(72) Inventors: Mihai-Ionut Stanciu, Bucharest (RO); Raja Venkatesh Tamma, Leander, TX (US); Khurram Waheed, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/430,688

(22) Filed: Feb. 13, 2017

(65) Prior Publication Data

US 2017/0338942 A1     Nov. 23, 2017

(30) Foreign Application Priority Data

May 17, 2016   (RO) .................................. 201600348

(51) Int. Cl.
*H04L 7/04*     (2006.01)
*H04W 52/02*   (2009.01)
*H04B 1/709*   (2011.01)

(52) U.S. Cl.
CPC ............ *H04L 7/042* (2013.01); *H04B 1/709* (2013.01); *H04W 52/028* (2013.01); *Y02D 30/70* (2020.08)

(58) Field of Classification Search
CPC . B60K 23/0808; B60T 8/172; B60T 8/17636; B60T 8/1769; B60T 8/48; H04B 1/709; H04L 7/042; H04W 52/028

USPC .......................................................... 370/311
See application file for complete search history.

(56) References Cited

U.S. PATENT DOCUMENTS

| | | | |
|---|---|---|---|
| 5,131,006 A * | 7/1992 | Kamerman | H04B 1/707 375/130 |
| 5,164,942 A | 11/1992 | Kamerman et al. | |
| 5,369,801 A | 11/1994 | Smith | |
| 5,491,723 A | 2/1996 | Diepstraten | |
| 5,561,673 A | 10/1996 | Takai et al. | |
| 5,995,535 A * | 11/1999 | Cai | H04L 7/027 375/145 |
| 6,236,674 B1 * | 5/2001 | Morelli | H04B 1/1615 375/219 |
| 6,466,958 B1 * | 10/2002 | Van Wechel | G01S 19/24 342/357.68 |
| 7,236,544 B2 | 6/2007 | Williams et al. | |
| 8,942,121 B2 | 1/2015 | Kamerman | |
| 9,167,667 B2 | 10/2015 | Trolese et al. | |

(Continued)

*Primary Examiner* — Huy D Vu
*Assistant Examiner* — Nizam U Ahmed (57) ABSTRACT

Disclosed is receiver apparatus including a first input configured to receive a first signal, a second input configured to receive a second signal, a switching circuit configured to alternate between the first and second signal from the first and second inputs, a receiver configured to sample the input signal to produce a plurality of input samples, a reference sequence generator configured to generate a reference signal, and a correlator configured to correlate the first and second signals with the reference signal to detect a correlation event, the correlator including a first buffer configured to receive signals from the first input and a second buffer configured to receive signals from the second input, wherein the correlator is configured to process the first signal in the first buffer, while the second buffer receives the second signal.

12 Claims, 5 Drawing Sheets

(56) References Cited

U.S. PATENT DOCUMENTS

| | | | |
|---|---|---|---|
| 2005/0095987 A1* | 5/2005 | Lyons | H04B 7/0814 455/67.13 |
| 2005/0195744 A1 | 9/2005 | Ryan et al. | |
| 2007/0258530 A1* | 11/2007 | Kim | H04B 1/707 375/260 |
| 2009/0285339 A1* | 11/2009 | Zhang | H04L 27/262 375/343 |
| 2012/0201181 A1* | 8/2012 | Goteti | H04W 72/1268 370/311 |
| 2016/0142950 A1* | 5/2016 | Kumar | H04B 7/0871 455/436 |

* cited by examiner

PREAMBLE DETECTION IN WIRELESS SYSTEMS WITH INTERMITTENT RECEPTION

CROSS-REFERENCE TO RELATED APPLICATIONS

This application claims the priority under 35 U.S.C. § 119 of Romanian patent application no. A201600348, filed May 17, 2016 the contents of which are incorporated by reference herein.

TECHNICAL FIELD

Embodiments described herein relate to systems, apparatuses, and methods of correlating a preamble with a reference signal.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments described herein relate to a receiver apparatus including a first input configured to receive a first signal, a second input configured to receive a second signal, a switching circuit configured to alternate between the first and second signal from the first and second inputs, a receiver configured to sample the input signal to produce a plurality of input samples, a reference sequence generator configured to generate a reference signal, and a correlator configured to correlate the first and second signals with the reference signal to detect a correlation event, the correlator including a first buffer configured to receive signals from the first input and a second buffer configured to receive signals from the second input, wherein the correlator is configured to process the first signal in the first buffer, while the second buffer receives the second signal.

The received samples may include samples received from the first signal and from the second signal.

The first buffer may process samples during a first time period and the second buffer processes samples during a second time period different than the first time period.

The first buffer may store samples during a third time period and the second buffer stores samples during a fourth time period different than the third time period.

The switching circuit may cut off reception of one of the first and second signals when preamble detection is determined in another of the first and second signals.

Various embodiments described herein also relate a receiver apparatus including an input configured to receive a signal, a receiver configured to sample an incoming input signal to produce a plurality of input samples, a reference sequence generator configured to generate a reference signal, a correlator configured to receive the antenna signal and the reference signal and correlate the antenna signal and reference to detect a correlation event, and a reference sequence controller configured to switch the input on and off to conserve power in the receiver apparatus.

The correlator may be configured to store received samples during an input on period and process received samples during an input off period.

Various embodiments described herein also relate to a method of operating a receiver including receiving a first signal from a first input, receiving a second signal from a second input, alternating between the first and second signal from the first and second inputs, sampling the input signal at a plurality of intervals, generating a reference signal, and correlating the first and second signals with the reference signal to detect a correlation event, the correlating including receiving signals from the first input in a first buffer and receiving signals from the second input in a second buffer and processing the first signal in the first buffer, while receiving the second signal in the second buffer.

The received samples may include samples received from the first signal and from the second signal.

The first buffer may process samples during a first time period and the second buffer processes samples during a second time period different than the first time period.

The first buffer may store samples during a third time period and the second buffer stores samples during a fourth time period different than the third time period.

The method may include cutting off reception of one of the first and second signals when preamble detection is determined in another of the first and second signals.

Various embodiments described herein may also relate to a method of operating a receiver including receiving a signal from an input, sampling the signal from the input to produce a plurality of input samples, generating a reference signal, receiving the input signal and the reference signal and correlating the antenna signal and reference to detect a correlation event, and switching the input on and off to conserve power in the receiver apparatus.

The method may include storing received samples in the correlator during an input on period and processing received samples in the correlator during an input off period.

The method may include rotating a reference waveform of the reference signal to achieve an alignment with received samples from the input signal.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. The terms "first," "second," "third," etc. are not meant to be limiting and can be alternated or substituted with other words such as "one," "another," "yet another," etc. and not lose the meaning of the terms described herein.

Embodiments described herein may be used to increase performance for various systems such as those that use a single receiver circuit, those that use a synchronization preamble to synchronize received bursts in an asynchronous wireless system, and those that use a low cost crystal which may lead to carrier frequency offsets. Because a synchronization preamble may be long, portions of the preamble may be buffered by a receiver for different periods, and different techniques that cause blackout periods in a received signal may be implemented.

Several manners of detecting a repetitive preamble in a receiver with intermittent reception are described herein. Embodiments may include an input switch such as a switching unit to switch between a plurality of inputs or antennas to deliver a portion of a preamble to a correlation circuit. Additional embodiments may periodically turn receiver circuits on and off to achieve power consumption reduction while detecting the preamble and subsequent signal.

A correlation circuit and an enhanced processing algorithm may be used to exploit preamble timing and increase a probability of preamble detection. This may decrease an average period of time that a packet is presented on the air and the preamble is detected. A method of choosing the timing is described in which a signal phase continuity may be allowed even if a signal black-out is determined by a transient processes in front-end circuitry, thus increasing the probability of early detection. An algorithm is described herein that manages various scenarios regarding incoming signals.

A system may have a single receiver chain. When detecting a signal, different reception cases may arise when a steady signal is not present. In one case, the reception of the signal may be intermittent, meaning for some periods of time there is a signal and for some periods of time there is no signal, or a noise signal. Embodiments described herein provide circuitry and algorithms to address these and other scenarios.

Embodiments herein are described using the IEEE 802.15.4 having a 2.4 GHz standard, having a preamble 128 µs in length. The preamble may be long enough to utilize on/off circuits and cycles to receive and process a signal. The embodiments described herein may also be applied to other communication protocols and systems.

Figure 1:
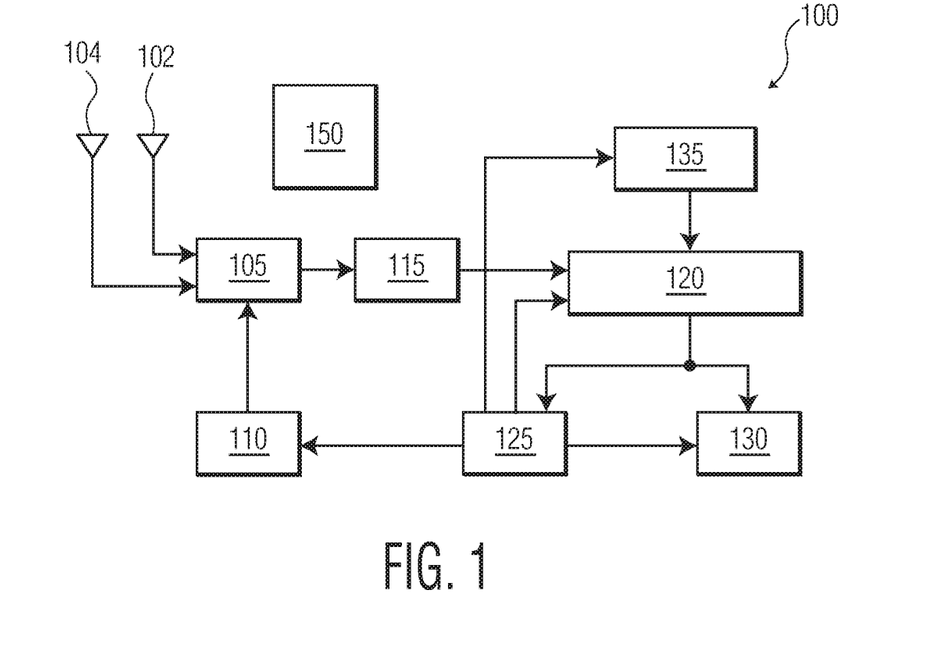
FIG. 1 illustrates a block diagram of a receiver apparatus in accordance with embodiments described herein.

FIG. 1 illustrates a block diagram of a receiver apparatus 100 in accordance with embodiments described herein.

The receiver apparatus 100 includes a first antenna input 102 and second antenna input 104 to receive an incoming signal. A two-antenna input system will be described but the methods and components used for two antennas may be expanded to three or more. The antenna inputs may be referred to herein as antennas.

The receiver apparatus may include a front end receiver 105 configured to receive signals from first antenna 102 and second antenna 104. The receiver apparatus 100 includes an antenna switch 110 configured to send a control signal to the front end receiver 105 for antenna selection. After receiving a control signal from the antenna switch 110, the front end receiver 105 acts as a filter to pass transmission from first antenna 102 or from second antenna 104 to an analog-to-digital converter (ADC) 115. For digital reception, the ADC 115 may not be used.

The receiver ADC 115 may alternately receive the two transmissions from first antenna 102 or second antenna 104 selected by the antenna switch 110. The receiver apparatus 100 may include a controller 150 to control the various aspects of the receiver apparatus 100. The controller 150 may include processing, control, and memory components.

The receiver apparatus 100 may also include a correlator 120 and an intermittent receive detector 125. In a situation where intermittent reception is detected by the correlator 120 and the intermittent receive detector 125, the correlator 120 and intermittent receive detector 125 are implemented to determine which signal from first antenna 102 or second antenna 104 is able to be clearly detected and subsequently decoded and demodulated for reception. The correlator 120 and intermittent receive detector 125 may be used for preamble detection.

The receiver apparatus 100 may include a time and frequency synchronization block 130 to handle processing of latter parts of a transmission after the preamble has been detected. When a detection event occurs within the correlator 120, the correlator may pass the transmission including correlation values to the time and frequency synchronization block 130 for further processing, and the intermittent receive detector 125 may send synchronization signals to the time and frequency detection block 130. The time and frequency synchronization block 130 accomplishes time and frequency synchronization for the receiver apparatus 100.

If the correlator 120 fails to detect a preamble, the correlator 120 notifies the intermittent receive detector 125, and the intermittent receive detector 125 may send a signal to the antenna switch 110 to continue cycling through antenna receive signals via first antenna 102 and second antenna 104.

The intermittent receive detector 125 may also provide reference sequence control data to a reference sequence generator 135. The reference sequence generator 135 may be a block or circuit that may furnish a reference signal to be compared to a received signal from first antenna 102 or second antenna 104 to perform a correlation operation. The reference sequence generator 135 may also generate several frequency shifted sequences similar to the reference signal to use during preamble detection. These signals may be sent to the correlator 120.

Figure 2:
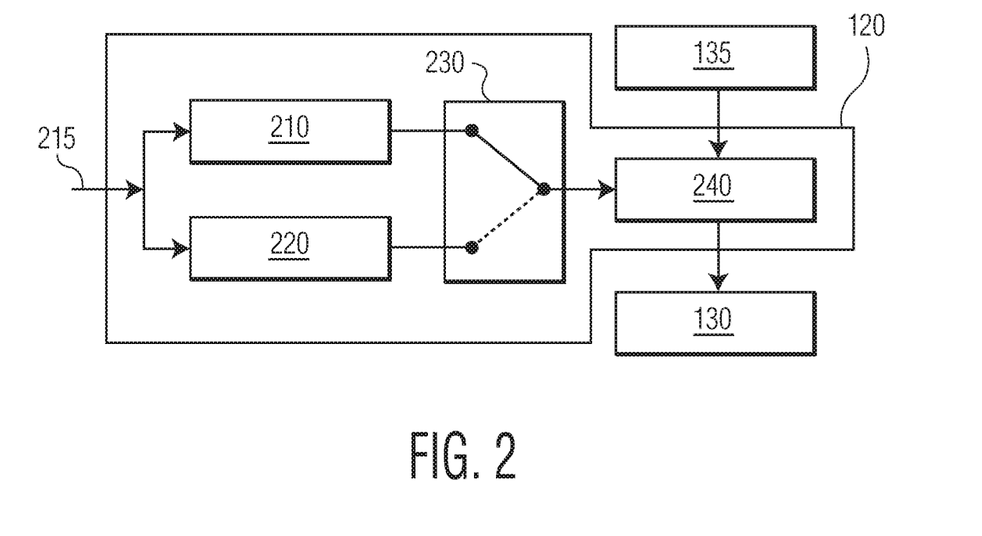
FIG. 2 illustrates a correlation block structure in accordance with FIG. 1.

FIG. 2 illustrates a correlator 120 structure in accordance with FIG. 1. The correlator 120, may be used in combination with other blocks to detect whether a preamble is detected by the receiver apparatus 100. The correlator 120 may include first buffer 210 and second buffer 220. The first buffer 210 and second buffer 220 may be known as freeze buffers because they may hold sampled data in place for a period of time to evaluate the data stored therein.

When an incoming signal is transmitted from first antenna 102 or second antenna 104, baseband samples 215 received from the ADC 115 may be sent to the correlator 120. In the correlator 120, the first buffer 210 may correspond to transmissions received from the first antenna 102. The second buffer 220 may correspond to transmissions received from the second antenna 104.

According to embodiments described herein, a first signal from first antenna 102 and received in first buffer 210 and a second signal from second antenna 104 and received in second buffer 220 may be two parts of a same preamble signal. Because a preamble in accordance with IEEE 802.15.4 is 128 µs long, the first antenna 102 and second antenna 104 in accordance with embodiments described herein are designed to alternately receive portions of the preamble for subsequent processing. Antenna switch 110 may control the front end receiver 105 to process a first portion of a received signal for a first time period, and may signal the front end receiver 105 to process a second portion of the received signal for a second time period. The front end receiver 105 may output subsequent sections of a preamble into the correlator 120.

First antenna 102 and second antenna 104 may receive a transmission at substantially the same time, or at different times. First antenna 102 and second antenna 104 may be located relatively close to one another in physical space, or may be distanced apart such that one antenna may not receive a clear signal. First antenna 102 and second antenna 104 may also have different polarizations or application specific arrangement such that one antenna may receive a good signal whereas the other antenna may not. In other scenarios, first antenna 102 and second antenna 104 may struggle to receive a clear signal and the receiver apparatus 100 cycles between the first antenna 102 and second antenna 104 until a clear signal may be detected.

As illustrated in FIG. 2, the first buffer 210 and second buffer 220 may each receive the baseband samples 215 from the ADC 115. First buffer 210 and second buffer 220 may alternate in functionality. While the first buffer 210 may accumulate samples from a portion of the preamble, the second buffer 220 may be used to process a previous or subsequent part of the preamble to determine a detection event.

The correlator 120 may include a buffer selector 230 to control the outflow of buffered samples from first buffer 210 and second buffer 220. Inputs from the reference sequence generator 135 and the buffer selector 230 are input to an adder tree 240 within the correlator 120. The adder tree 240 compares samples received from the buffer selector 230 with shift sequences received from the reference sequence generator 135 to determine if a preamble detection has occurred.

If the correlator 120 determines there has been a preamble detection, the correlator 120 may send correlation values to the time and frequency synchronization block 130 for further processing of the signal, such as to detect a start-of-frame delimiter. If the correlator 120 determines there has not been a preamble detection, the correlator 120 signals the intermittent received detector 125 to continue to seek new samples. If the system fails to find a frame delimiter in the time and frequency synchronization block 130, the system may cycle back to the intermittent receive state. If the system detects a delimiter then the system may move on to demodulation to obtain data bits from a received packet.

Figure 3:
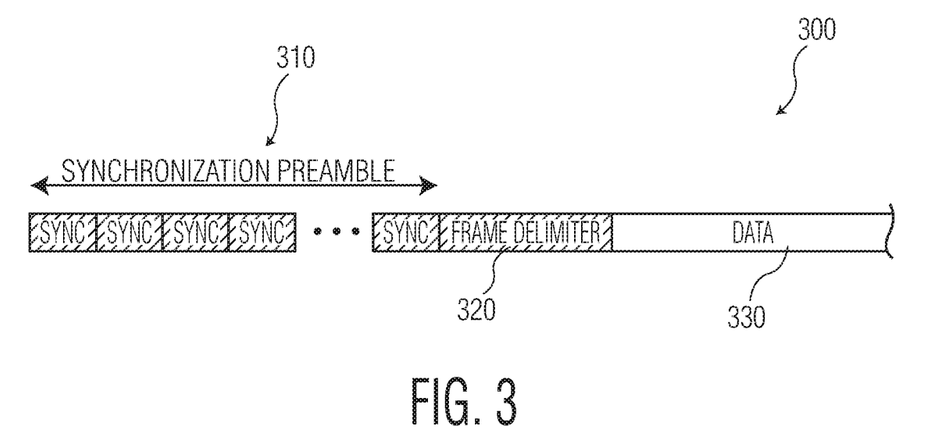
FIG. 3 illustrates a sample signal to be received by a receiver apparatus in accordance with embodiments described herein.

FIG. 3 illustrates a sample signal 300 received by a receiver apparatus in accordance with embodiments described herein. The sample signal 300 may include a synchronization preamble word 310 with a length of 128 µs, a frame delimiter 320 to be used for timing synchronization, and a data payload 330 to be decoded and demodulated. Using the IEEE 802.15.4 specification as an example, for a given preamble, there may be eight identical SYNC symbols. Each symbol has a 16 µs length, so the total length of a preamble may be 128 µs. The synchronization preamble may include multiple synchronization words SYNC. Frequency synchronization is carried out over the SYNC symbols that form the preamble.

Figure 4:
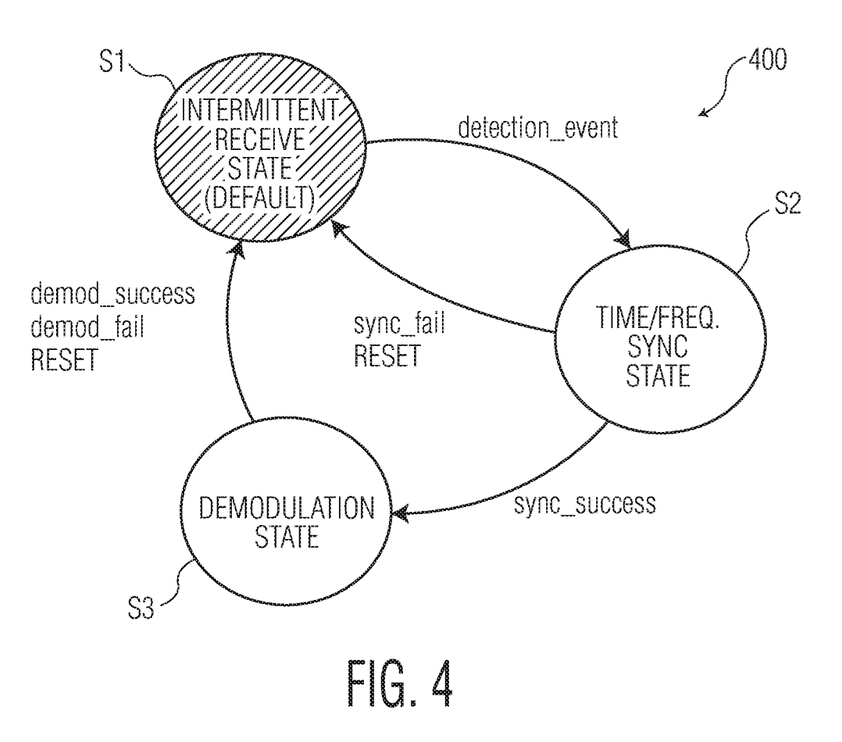
FIG. 4 illustrates a high level state machine in accordance with embodiments described herein.

FIG. 4 illustrates a state machine 400 in accordance with embodiments described herein. The state machine 400 may describe movements of one or more data packets through the receiver apparatus 100. A first level includes an intermittent received state S1 in which correlated samples may be received from first antenna 102 or second antenna 104 in an intermittent manner. During intermittent receiving, a SYNC symbol may be searched for by alternately using the first buffer 210 and second buffer 220 in the correlator 120. SYNC detection may be interrupted by the presence of blackout periods.

When a SYNC is found a detection event signal is generated and the state machine 400 transitions to timing and frequency synchronization state S2. A detection timeout period may be used after the state machine 400 transitions to timing and frequency synchronization state S2. The detection timeout may be reset when SYNC is found again. If the timeout expires a sync_fail signal may be generated and the state machine may be reset. After timing and frequency synchronization state S2 if the synchronization is a success a sync_success signal is generated, and the synced signal may be sent to a demodulator in a demodulation state S3. If the synchronization fails a sync_fail/reset message may be generated and an algorithm may be reset to the default intermittent receive detection state S1. If the demodulator successfully demodulates the signal, the state machine may go back to S1 to detect another packet, or if there is a demod_fail, the controller 150 may reset an algorithm to the default intermittent receive detection state S1.

Figure 5:
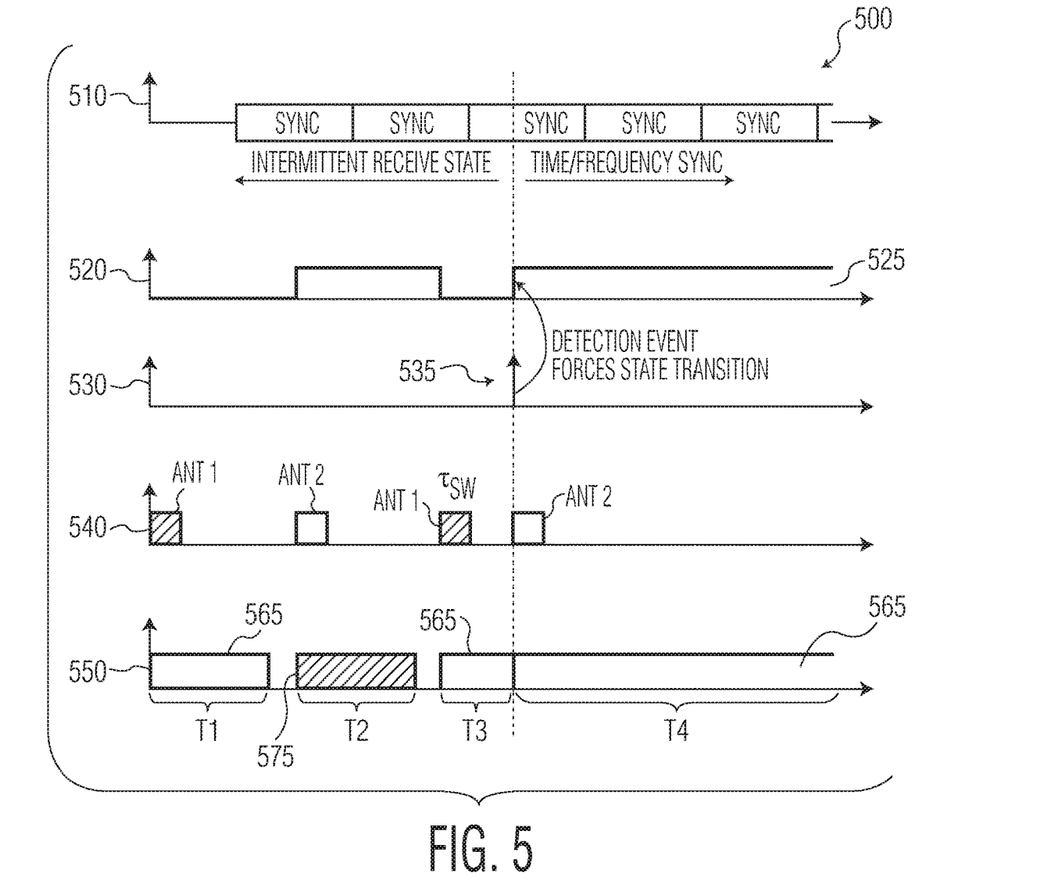
FIG. 5 illustrates an antenna switching scenario in accordance with embodiments described herein.

FIG. 5 illustrates an antenna switching scenario 500 in accordance with embodiments described herein. FIG. 5 illustrates several waveforms before and after a detection event 535. Within the antenna switching scenario 500, a first graph 510 illustrates a burst preamble received at first antenna 102 and second antenna 104. A second graph 520 illustrates the duty cycle of an antenna control signal 525 for controlling antenna switch 110 that is sent to the front end receiver 105. The antenna control signal 525 is used to cycle first antenna 102 and second antenna 104 on and off to receive inputs alternately from each antenna until a detection event occurs.

When one or a plurality of SYNC symbols illustrated in the first graph 510 is detected, the detection moment may not come at an exact boundary of a SYNC symbol. Because processing by first buffer 210 and second buffer 220 of respective signals from first antenna 102 and second antenna 104 will not always have the same timing as the first antenna 102 and second antenna 104, often when a detection event occurs, one antenna transmission may be cut off to allow the other antenna with a clearer signal to be connected within the receiver apparatus 100.

A detection event 535 is illustrated by an arrow along a dotted line that spans graphs 510 to 550. When enough samples are obtained in the correlator 120 to produce a correlation peak at the output of the correlator 120, a detection event may occur.

Graph 540 illustrates a blackout condition due to antenna switching. After each antenna switch there is a period, $\tau_{sw}$, where a good signal is not received, known as a transitory period. In this period there is a signal that may not represent the value of the received signal when an automatically controlling mechanism, for example automatic gain control (AGC), in the ADC 115 needs to settle. After the transitory period, the correlator 120 may need to set a proper gain using the reference sequence generator 135 to correctly receive the signal that requires the settling period, which may be a transient period after an antenna switch.

As illustrated in FIG. 5, the content of a buffer used for processing may contain invalid or corrupted received samples as well as valid received samples received from an antenna that receives signals at a good signal to noise ratio after a transient period $\tau_{sw}$ expires as illustrated in graph 540. The samples may be invalid due to a low signal to noise ratio corresponding to the antenna used to receive these samples. The samples may be corrupted due to transients in the received signal chain caused by an antenna switching event and/or receiver dynamics such as gain change or other variables.

A first valid sample in a buffer used for processing may not be synchronized with the precise boundary of one of the SYNC symbols illustrated in the first graph 510. In general the content of the buffer used for processing is a circularly shifted version of a SYNC symbol that has propagated through the channel, the antenna, and the receiver circuits. In order to address this, a reference waveform that includes an ideal SYNC symbol used for correlative comparison may be sequentially rotated in order to identify the relative delay between the content of the buffer used for processing and the actual boundary of a SYNC symbol.

Graph 550 illustrates processing that is performed in each first buffer 210 and second buffer 220 during different up and down cycles of the antenna signal. First buffer 210 and second buffer 220 are alternately used to speed-up detection of a preamble. At each time period, such as T1 and T2, one buffer is configured to process samples processing from one antenna, and a second buffer is configured to acquire samples from the other antenna.

The buffered samples are processed in a frozen state until all reference sequences are shifted and compared to the frozen samples. In order to use valid samples for the processing, a buffer's state may change to frozen when an oldest sample in the buffer has been acquired after the expiration of $\tau_{sw}$. When a SYNC symbol is detected in the preamble, information about timing and frequency synchronization indexes are provided to the time and frequency synchronization block 130.

Using two buffers, after an antenna is switched, samples are processed. The blocks 565 represents the processing performed by the second buffer 220 for second antenna 104 and the striped block 575 represents the processing performed by first buffer 210 for first antenna 102.

Referring to FIGS. 1 and 5, during a first antenna period 0 of a signal illustrated in the second graph 520, antenna switch 110 outputs a 0 signal to the front end receiver 105. The front end receiver 105 that receives transmissions from first antenna 102 and second antenna 104 filters out or switches off transmission from second antenna 104, and allows signals from first antenna 102 to fill the first buffer 210 in the correlator 120. While samples from first antenna 102 are being stored in the first buffer 210, samples previously stored in the second buffer 220 are being processed for correlation in the correlator 120. Samples being processed for correlation in the second buffer 220 are represented by the block 565. Samples subsequently processed by the first buffer 210 are represented by the striped block 575.

When the signal from antenna switch 110 becomes 1, the opposite is performed. The symbols in the first buffer 210 are processed, the system receives/buffers samples received from second antenna 104 in the second buffer 220. Thus the first buffer 210 may be used to receive samples while the second buffer 220 may be used for processing, and vice versa.

In graph 530, after the antenna switch 110 has cycled from 1 to 0, and while first antenna 102 is in a receive state and storing new samples, the system realizes that a detection has been obtained from samples processed by the second buffer 220 during time T3. The system has obtained a good correlation with the samples that have been buffered from second antenna 104. When this preamble detection occurs, the first antenna 102 had been switched on and sending samples to the the first buffer 210 in correlator 120. Because the detection event corresponds to the second buffer 220 that is associated with second antenna 104, the system shuts off transmission from first antenna 102 and switches back to second antenna 104 at T4 and second antenna 104 remains on for packet reception, as long as the signal remains steady. Thus time/frequency synchronization information is stored and the systems transitions to a time/frequency synchronization state.

After the detection, as illustrated in FIG. 4, the system transitions to the timing and frequency synchronization state S2. From the timing and frequency synchronization state, the system may further process the signal to demodulation, or it may go back to intermittent reception, depending on what happens in the state S2.

The timing of when packet detection occurs is random, it could be early or late in a rotation. For detection, the reference waveform used for correlation with the samples stored in the processing buffer is sequentially rotated. At the substantially halfway point of processing samples from one antenna in graph 550 there have been adequate rotations of the stored reference symbol so that alignment with the samples that are buffered can be detected.

Figure 6:
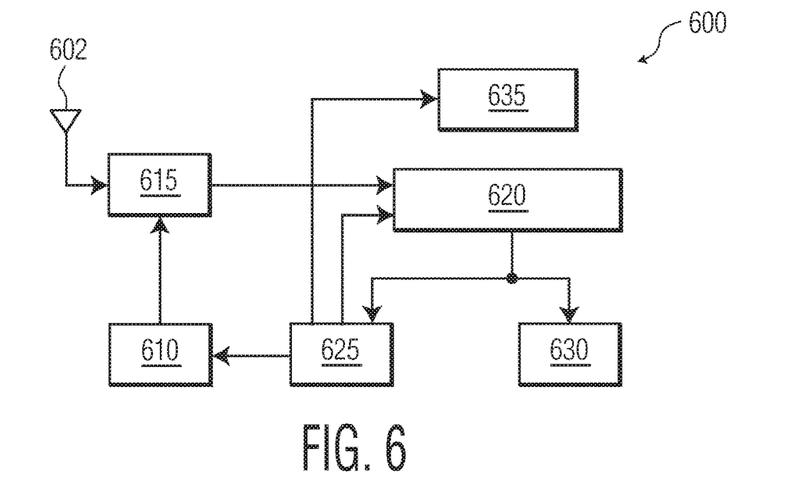
FIG. 6 illustrates an ON/OFF receiver circuit in accordance with embodiments described herein.

FIG. 6 illustrates an on/off receiver circuit 600 in accordance with embodiments described herein. Instead of a plurality of antennas being alternated to detect an intermittent signal, a single antenna 602 may be used and the antenna 602 and related circuitry may be cycled between an on state and an off state at a certain rate to reduce power consumption, yet still offer a mechanism for detecting an intermittent signal.

The on/off receiver circuit 600 includes many similar components as those illustrated in FIG. 1. Correlator 620, reference sequence generator 635, intermittent receive detector 625, and time and frequency synchronization block 630 perform in substantially the same manner to correlator 120, reference sequence generator 135, intermittent receive detector 125, and time and frequency synchronization block 130 illustrated in FIG. 1. Instead of a front end receiver 105 and antenna switch 110, the on/off receiver circuit 600 includes a receiver sequence control circuit 610 to cycle the ADC receiver 615 between an ON and OFF state. In this embodiment, in the correlator 620 a single first buffer 210 or second buffer 220 may be used. The other buffer may be switched off. During an OFF period, there are no samples received, and therefore no reason to store new samples in a separate buffer.

In an ON state, the on/off receiver 600 may be on long enough, for example fifty percent of the time to capture part of a preamble signal, and then perform a correlation during the off state. When the circuit cycles off and does not input samples, correlation is performed and when a detection event occurs, the on/off receiver circuit 600 may switch back on and stay on.

In accordance with the on/off receiver circuit 600, two types of processing may be used, known here as Type 1 processing and Type 2 processing. In Type 1 processing, samples may be processed as they are input to a buffer in the correlator 620, thus there is no shift of the reference sequence is performed. In Type 1 processing after preamble detection, a fast transition to the timing and frequency synchronization state may occur. A difference between the moment when circuits are turned off and the moment when a next warm-up ends may be a multiple of SYNC duration, which may insure SYNC symbol phase continuity. Warm-up may refer to a transitory controlled timing sequence which is used to bring up the receiver circuits to a known good ready reception state after the receiver is switched from OFF to ON state.

In Type 2 processing, samples may be frozen in a buffer and reference sequences may be shifted and compared to the frozen sequences to obtain a correlation. When a SYNC symbol is detected during Types 1 and 2 processing, the timing and frequency information may be stored and provided to the time and frequency synchronization block 630.

In various designs, the receiver apparatus 100 and on/off receiver circuit 600 may operate independently and in a same circuit, processing samples simultaneously or at different times.

Figure 7:
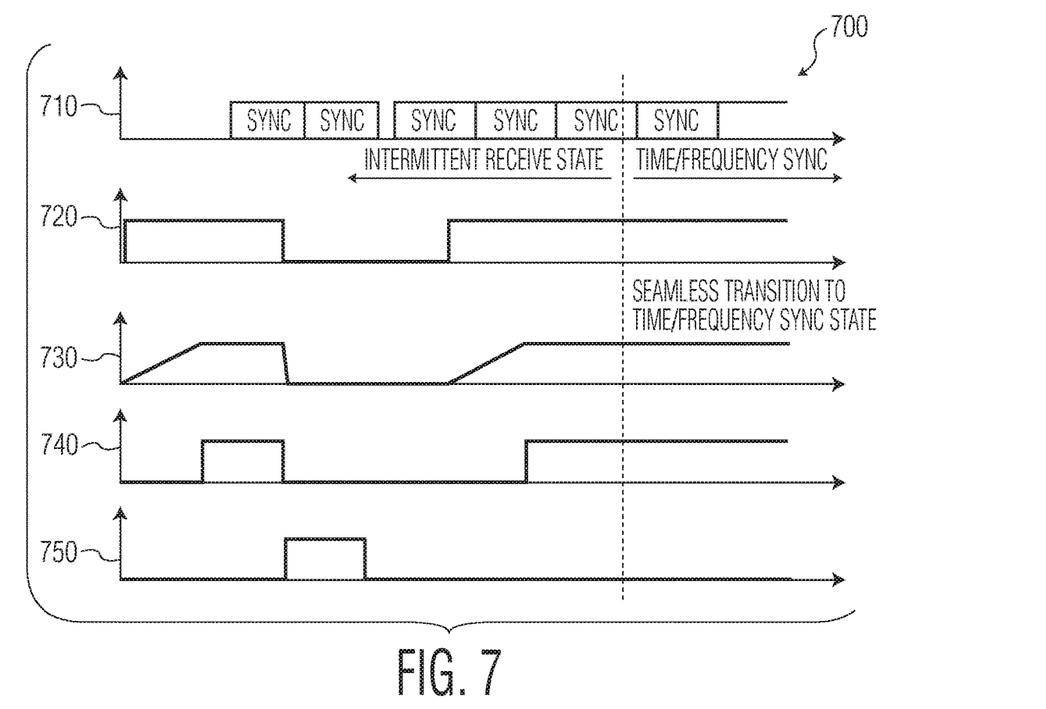
FIG. 7 illustrates a timing diagram to detect a correlation event in accordance with the on/off receiver illustrated in FIG. 6.

FIG. 7 illustrates a timing diagram 700 to detect a correlation event in accordance with the on/off receiver illustrated in FIG. 6. Graph 710 represents a received burst. Graph 720 represents a control signal for the circuit emanated by a clock or controller, representing a switch on and off. During a warm up time in graph 730, the on/off receiver circuit 600 will not come on right away. There is a transitory warm-up period to settle the circuit components.

After a warm up period, Type 1 processing may begin during an on period as illustrated in graph 740. During the Type 1 processing, the received samples in the buffer are being shifted over a reference waveform to perform a correlation operation. The reference waveform is not shifted during Type 1 processing. During Type 1 processing, the samples are being refreshed in a buffer as new samples are received from the antenna 702. Because graph 740 after the detection event dotted line represents active reception and processing of a received signal, the signal line of graph 740 will remain high.

In graph 750, when the circuit is switched off, Type 2 processing is processing the "frozen" samples that are present in the buffer. In Type 2 processing the samples are being kept in a frozen state and the reference waveform is being rotated around relative to the received samples to perform a correlation operation. During Type 2 processing, since the antenna is switched off, there are no new samples being entered into the buffer. Only the samples entered into the buffer during the ON state are frozen and processed.

As illustrated in FIG. 7, the correlation peak is detected during Type 1 processing, in a moment when the on/off signal in the graph 720 is high. Because samples are being received, the system does not have to wait to continue processing the symbol being received. Related to the state table of FIG. 4, there are no delays between the moment the system is transitioning between an intermittent receive state S1 and the timing and frequency synchronization state S2.

Figure 8:
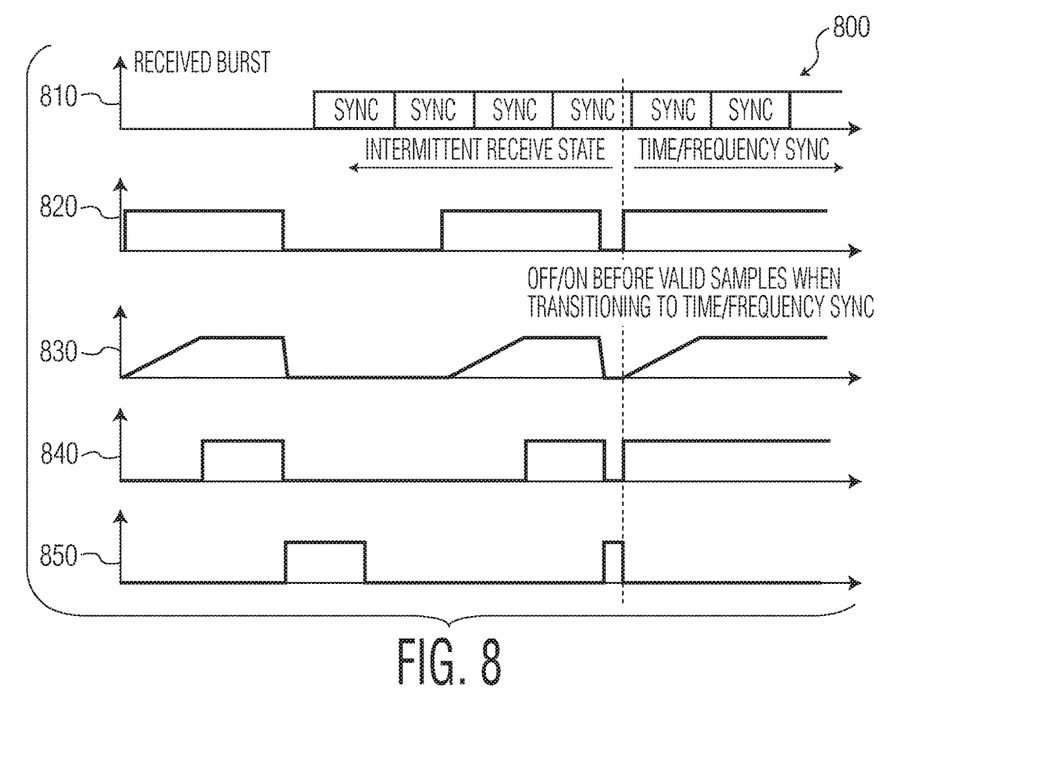
FIG. 8 illustrates another timing diagram to detect a correlation event in accordance with the on/off receiver illustrated in FIG. 6.

FIG. 8 illustrates another timing diagram 800 to detect a correlation event in accordance with the on/off receiver of FIG. 6. Similar to FIG. 7, a received burst of a preamble signal is received in the graph 810. As illustrated in FIG. 8 the system is obtaining a detection when the signal in the graph 820 is low, during an off state of the on/off receiver circuit 600. After the detection, the system turns all the circuits ON and waits for a warm up period in the graph 830. After warm up, the system waits to get the full symbol in a buffer, so there is a delay between the moment of detection of the intermittent signal, and the moment where the system has valid symbols or samples in the buffer. In FIG. 8, detection may occur during Type 2 processing in graph 850 when the signal in the graph 820 is cycled off. When this happens, the on/off receiver circuit 600 may be switched back on so that samples may be received on the antenna 602. Because graph 840 after the detection event dotted line represents active reception and processing of a received signal, the signal line of the graph 840 will cut off sample processing in a low state, and switch back to a high state to receive the samples from antenna 602.

Figure 9:
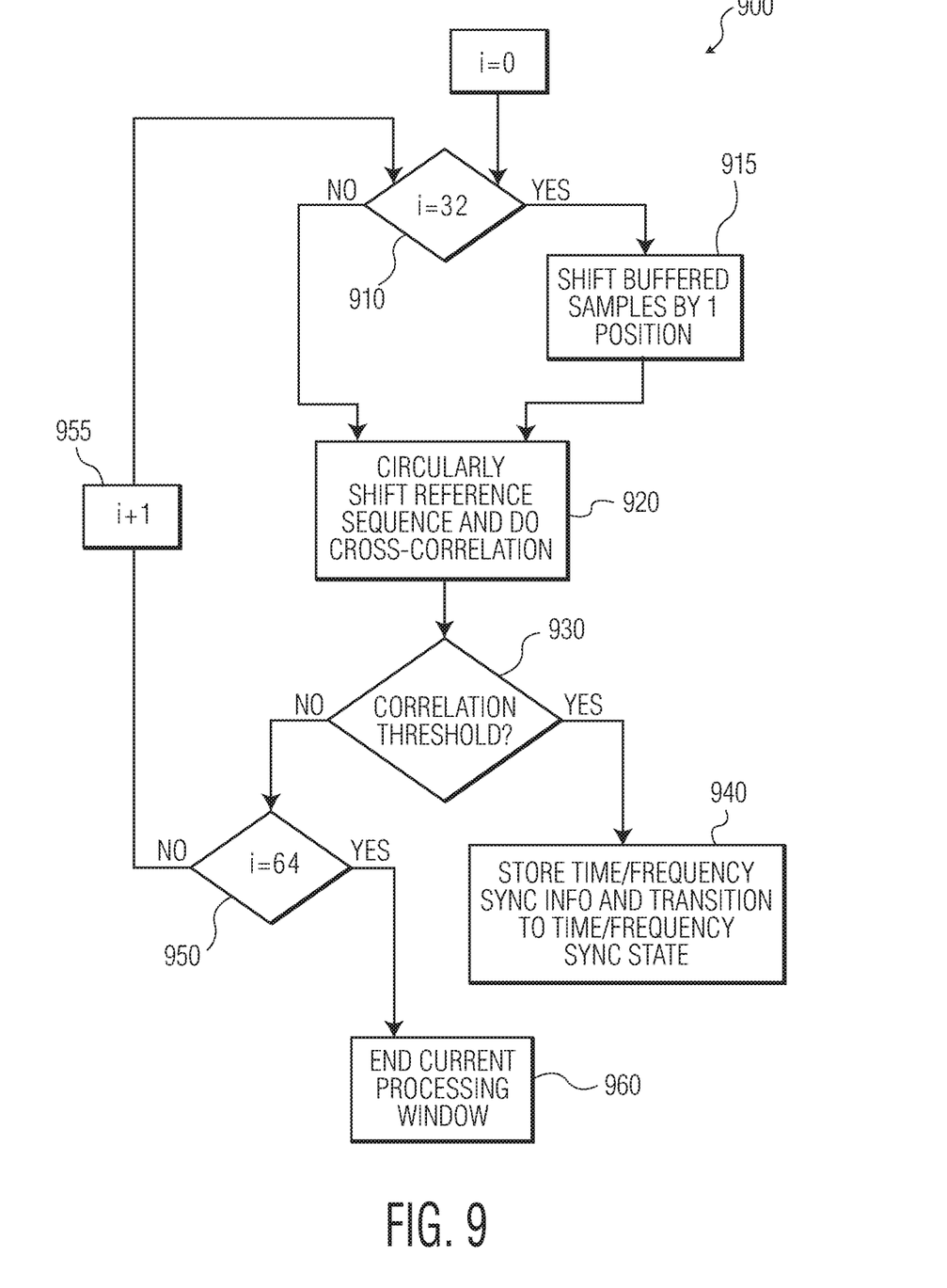
FIG. 9 illustrates a flow diagram in accordance with embodiments described herein.

FIG. 9 is a flow diagram 900 in accordance with embodiments described herein. The flow diagram 900 may be representative of actions that take place during Type 2 processing in which all the samples in the buffer are frozen and a reference waveform is rotated around the frozen samples to obtain a detection event. The flow diagram 900 may also be illustrative for steps performed by the switching antenna embodiments illustrated in FIGS. 1-5.

The flow diagram 900 may correspond to an example case where Symbol SYNC contains 64 samples, and a reference sequence contains 32 values, in which every other sample is used for correlation. The 32 values may be oversampled at a sampling rate of two to produce 64 samples to be tested. The system may be choosing between two possible time indexes because of the oversampling ratio of two, but the system is not limited thereto. As discussed herein, the reference sequence generator may over sample up to eight or more times to test reference signals that are frequency shifted to determine a correct carrier offset. The duration of one sync symbol may also be the length of correlation used by the correlator 120.

As illustrated in FIG. 9, Type 2 processing may begin at i=0. A determination is made whether i=32 at step 910. When there is an index lower than 32 (NO), nothing is done with the sample in the buffer, and a reference sequence is rotated one sample at step 920. With each iteration the reference sequence is shifted after rotation of the reference sequence, a cross correlation of the reference sequence with the frozen samples stored in the buffer is conducted at step 930. When the correlation is above a correlation threshold at step 930 (YES), there is a preamble detection and the system transitions to the timing and frequency synchronization state at step 940. Also, timing and frequency synchronization information may be stored. If there is no correlation detection, a determination is made whether i=64 to determine whether all the samples have been tested at step 950. If the result is NO, i is incremented by one at counter 955 and the loop resumes at step 910. When i=64 this means that all possible samples have been tried, so the current processing window ends at step 960.

When it is determined that i=32 at step 910 (YES), the system has correlated all the values in the reference sequence, and the sample is shifted at step 915 in the buffer by one position in order to check another timing value.

For example, when a system has buffered four values into a buffer, such as four bits, an oversampling of two may create eight samples in the buffer to be tested. When rotating the reference signal, the system will use the samples 0, 2, 4 and 6 for correlation. The method correlates against the 4 bits of the reference sequence, and the 4-bit sequence is rotated, so the reference signal is rotated to test against a different head to tail sequence with each of the four samples at the head. After the system finishes all the rotations, the system shifts the samples in the buffer by one position to try the samples with indexes 1, 3, 5 and 7, until all the samples are tested. If a correlation is obtained, the system transitions to the timing and frequency synchronization state. If the system times out at step 960 without detecting a correlation, another sample size is buffered into a buffer and the algorithm is repeated.

As noted, the reference sequence generator 135 or 635 may be used to compensate for a frequency offset between a transmitter and a receiver. IEEE 802.15.4 specifies that a system has to support up to a +/−200 khz offset between transmitter and receiver. While the system looks for the synchronization symbols, frequency offsets also may be accommodated.

Thus the reference sequence generator 135 or 635 may provide reference synchronization symbols offset by certain frequency offsets, in steps of 50 kHz. In order to support +/−200 kHz, there can be 8 reference sequences, the first reference sequence being tuned to carry an offset of −175 khz, then −125 kHz, −75 kHz, −25 kHz, 25 kHz, 75 kHz, 125 kHz and 175 kHz. The same reference synchronization symbol may be used that is offset by a different carrier offset. Thus there may be eight versions of the same signal, at different frequencies. This frequency offset may then be fed into the system processing. Thus the reference sequences may be rotated as described herein, in a circular manner. The reference sequences may be sent to the correlator 120 or 620 one after the other to help the system detect the carrier offset and compensate for when receiving a signal.

Embodiments described herein include time interleaved processing and efficient use of computational resources and reduced blackout time. The processing may be augmented by a time-efficient capability of the system to cut off ongoing sample collection on a currently selected antenna and switch back to a different antenna that had samples indicative of preamble present. Embodiments described herein may statistically provide increased antenna selection performance that exhibits greater sensitivity performance of the receiver.

The components designated in the blocks may be dedicated hardware components that are designed and implemented for the tasks attributed thereto. The hardware components may include integrated circuits as well as other circuit elements. Each block may be a different circuit, or multiple blocks may be incorporated into a circuit in various combinations. Also, the blocks described herein may be control methods used to control various hardware devices, or may be methods to control various aspects of a chip-level implementation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word comprising does not exclude the presence of elements or steps other than those listed in a claim. The word "a" or "an" preceding an element does not exclude the presence of a plurality of such elements. The invention can be implemented by means of hardware including several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A receiver apparatus, comprising: a first input configured to receive a first signal from a first antenna; a second input configured to receive a second signal from a second antenna, wherein the first signal and the second signal are two parts of a preamble signal; a receiver configured to process the first signal for a first time period and the second signal for a second time period to produce a plurality of input samples; a switching circuit configured to alternate processing of the receiver to select between the first and second signals from the first and second inputs; a reference sequence generator configured to generate a reference signal; and a correlator configured to correlate the first and second signals with the reference signal to detect a correlation event, the correlator including: a first buffer configured to receive first samples from the first input, a second buffer configured to receive second samples from the second input, an adder tree configured to compare either the first samples or the second samples to the reference signal to detect the correlation event, and a buffer selector configured to control outflow of buffered samples from the first buffer and the second buffer, wherein the correlator is configured to detect the preamble signal based upon a comparison of samples received from the buffer selector with shift sequences received from a reference sequence generator and, in response to a failure to detect the preamble signal, the correlator is further configured to notify the switching circuit to continue cycling through the first signal and the second signal.

2. The receiver apparatus of claim 1, wherein the input samples include samples received from the first signal and from the second signal.

3. The receiver apparatus of claim 1, wherein the first buffer processes samples during a first time period and the second buffer processes samples during a second time period different than the first time period.

4. The receiver apparatus of claim 3, wherein the first buffer stores samples during a third time period and the second buffer stores samples during a fourth time period different than the third time period.

5. The receiver apparatus of claim 1, wherein the switching circuit cuts off reception of one of the first and second signals when the preamble detection is determined in another of the first and second signals.

6. A receiver apparatus, comprising: an input configured to receive an input signal; a receiver configured to sample the input signal to produce a plurality of input samples wherein a first signal and a second signal are two parts of a preamble signal; a reference sequence generator configured to generate a reference signal; a correlator configured to receive the input signal and the reference signal and correlate the first signal and the second signal and reference signal to detect a correlation event, the correlator including: a plurality of buffers to process the plurality of signals, an adder tree configured to compare one of the plurality of signals processed by the plurality of buffers to the reference signal to detect the correlation event, and a buffer selector to control an outflow of samples from the plurality of buffers, wherein the correlator is configured to detect the preamble signal based upon a comparison of samples received from the buffer selector with shift sequences received from a reference sequence generator and, in response to a failure to detect the preamble signal, the correlator is further configured to notify the switching circuit to continue cycling through the first signal and the second signal.

7. The receiver apparatus of claim 6, wherein the correlator is configured to store received samples during an input on period and process received samples during an input off period.

8. A method of operating a receiver, comprising: receiving a first signal from a first antenna; receiving a second signal from a second antenna, wherein the first signal and the second signal are two parts of a preamble signal; alternating between the first signal and the second signal from the first antenna and the second antenna; sampling the first signal and the second signal at a plurality of intervals; generating a reference signal; comparing, with an adder tree, either the first signal or the second signal to the reference signal to detect a correlation event; correlating the first signal and the second signal with the reference signal to detect a correlation event, the correlating including receiving first samples from the first antenna in a first buffer and receiving second samples from the second antenna in a second buffer; controlling outflow of buffered samples, with a buffer selector, from the first buffer and the second buffer; and detecting the preamble signal based upon comparison of samples received from the buffer selector with shift sequences received from a reference sequence generator and, in response to a failure to detect the preamble signal, the correlator is further configured to notify the switching circuit to continue cycling through the first signal and the second signal.

9. The method of claim 8, wherein the received samples include samples received from the first signal and from the second signal.

10. The method of claim 8, wherein the first buffer processes samples during a first time period and the second buffer processes samples during a second time period different than the first time period.

11. The method of claim 10, wherein the first buffer stores samples during a third time period and the second buffer stores samples during a fourth time period different than the third time period.

12. The method of claim 8, further comprising: cutting off reception of one of the first and second signals when preamble detection is determined in another of the first and second signals.

\* \* \* \* \*